US006498968B1

(12) United States Patent
Bush

(10) Patent No.: US 6,498,968 B1
(45) Date of Patent: Dec. 24, 2002

(54) OPTIMISTIC DISTRIBUTED SIMULATION FOR A UAV FLIGHT CONTROL SYSTEM

(75) Inventor: Stephen Francis Bush, Latham, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/994,448

(22) Filed: Nov. 27, 2001

(51) Int. Cl.$^7$ .................................................. G06F 7/00
(52) U.S. Cl. .................... 701/3; 701/1; 701/36; 701/66
(58) Field of Search ........................... 701/1, 3, 33, 36, 701/66; 455/522

(56) References Cited

U.S. PATENT DOCUMENTS 5,276,677 A * 1/1994 Ramamurthy et al. ...... 370/232
5,887,029 A * 3/1999 Husted et al. .............. 375/224

OTHER PUBLICATIONS

"Active Virtual Network Management Protocol", by Stephen F. Bush, General Electric Corporation Rresearch and Development, 13th Workshop on Paralled and Distributed Simulation, May 1–4, 1999, Atlanta, Georgia, USA, PADS '99.

"Islands of Near–Perfect Self–Prediction", by Stephen F. Bush, General Electric Corporation Research and Developmen, Virtual Worlds Simulation conference '00 and 2000 Western MultiConference, Jan. 2000.

* cited by examiner

Primary Examiner—Gertrude Arthur
(74) Attorney, Agent, or Firm—Scully, Scott, Murphy & Presser

(57) ABSTRACT

A real-time distributed model-based predictive control method having a time maintenance mechanism that solves all state synchronization problems. Method steps include generating a message that predicts a system value corresponding to a future time, and executing a control process using the system value contained within said message, resulting in a process state. The process state is then stored in a state queue. The local process time is rolled back to the latest valid local process time prior to said message if the message precedes the current process state time. Rolling back comprises retrieving the system state values at that latest valid local process time from said state queue and re-executing the control process, using the system value contained within the message, and storing the new state in the state queue. The method also includes rolling back if, upon receiving a message containing an observed system value, said observed system value differs from its predicted value by more than a predetermined tolerance. The method is carried out on a distributed processor control system.

16 Claims, 4 Drawing Sheets

OPTIMISTIC DISTRIBUTED SIMULATION FOR A UAV FLIGHT CONTROL SYSTEM

BACKGROUND OF THE INVENTION

1. Field of Invention

The invention relates generally to the field of distributed real-time control systems, and more particularly, it relates to an optimistic distributed control system for use in an Uninhabited Air Vehicle (UAV) flight control system.

2. Description of Related Art

Studies have shown that current UAVs have not met the degree of safety and reliability required for autonomous operation over populated areas or in airspace shared with commercial aircraft. Autonomy technologies that can provide reflexive responses and rapid adaptation, such as exhibited by a pilot, to compensate for a vehicle's structural, perceptual and control limitations are lacking. This is particularly evident when UAV mishap rates are compared to those of piloted systems.

Compared to piloted aircraft systems, current UAVs are designed to be very low cost and use smaller, low-power commercial off-the-shelf components and have very limited redundancy. Unfortunately, the lower requirement for reliability has led to higher failure rates. The higher failure rates are seen as somewhat acceptable because it does not mean the loss of human life, except when the vehicle flies over populated areas. It is desirable, however, for a UAV to be able to safely fly over populated areas, to safely share airspace with other piloted vehicles, and to generally improve the mission success rate. For these reasons, the UAV control systems must be capable of rigorously analyzing and predicting component failures, and their effects, to determine the appropriate response to faults much as a pilot does prior to, or in response to a system failure.

A new concept known as active state has been proposed to represent the state of highly dynamic and complex system. Time management is particularly critical in the active state model. For example, higher order biological systems are capable of reasoning about complex future events while simultaneously performing simpler current tasks. Expectations about future outcomes are modified as current events change. Adapting this concept to a rigorous real-time control system is a new challenge that has not yet been attempted.

BRIEF SUMMARY OF THE INVENTION

To overcome the foregoing and other drawbacks in the prior art, it is an object of the present invention to provide a control system that is capable of predicting the state of the system at some future time.

It is a further object of the present invention to provide a predictive control system with sufficient speed for real-time implementation.

It is still a further object of the present invention to provide a real-time predictive control system for distributed execution on multiple processors.

It is still a further object of the present invention to provide a real-time predictive control system for one or more UAVs in order to improve reliability, improve autonomy, to permit safe flight over populated areas, and/or to permit safe flight in airspace shared with other piloted vehicles.

In order to accomplish these and other objects, the present invention comprises a method of real-time distributed model-based predictive control. The method comprises the steps of generating a message that predicts a system value, the message having a receive time corresponding to a future time, and executing a control process using the system value contained within said message, resulting in a process state having a local process time corresponding to the receive time on said message. The process state at that local process time is then stored in a state queue. The local process time is rolled back to the latest valid local process time prior to the receive time of said message, only if said receive time precedes the current process state time. Rolling back comprises retrieving the system state values at that latest valid local process time from said state queue and re-executing the control process, using the system value contained within the message, and storing the new state in the state queue.

The method according to the present invention also comprises rolling back only if, upon receiving a message containing an observed system value, said observed system value differs from its predicted value by more than a predetermined tolerance.

The method is carried out on a distributed processor control system. Messages from one processor can be sent to other processors to further carry the model forward in time.

BRIEF DESCRIPTION OF THE DRAWINGS

These and other features, aspects and advantages of the system and methods of the present invention will be apparent from the following description, drawings and appended claims, where like numerals indicate like elements across the various views:

DETAILED DESCRIPTION OF THE INVENTION

In order to allow a control system to be forward-looking as opposed to merely reactive, the control model includes a model of itself at some future time. In conjunction with simulated future sensor inputs received from driving processes, explained further infra, the model then would make present decisions taking into account the impact of likely future circumstances.

In model-based predictive control, a receding-horizon strategy is used. For each time instant t, future control signals are determined from an optimization of the model including future values of the state and model responses. A function that includes the cost of future controls (e.g., resources such as fuel or battery power), and deviation from the set point (e.g., planned course or destination) is optimized to give the best future control sequence. The first control of the sequence is asserted and the entire operation is repeated at time t+1.

The foregoing is an outline of only the most basic considerations of a predictive control system. In sophisticated embodiments, such as UAV control, an obvious problem occurs. Models that are more complex require more time to generate the output when the proposed control signals are applied. However, another subtle problem occurs when the entity being controlled contains a model of itself. Manipulating the model takes an unknown amount of time and resources from the controlled entity. Yet, the controlled entity is attempting to use these results to control itself. Thus, if the entity attempts to control its control of itself, an infinite recursion or a tangled hierarchy can result.

The instant invention solves these problems by the speedup gained through parallelism. Either a single vehicle has multiple processors or multiple processors are configured across vehicles of a swarm. However, this solution creates a new problem, namely the lack of a precise time. We cannot assume each processor's clock is synchronized to exactly the same time. To gain the maximum speedup available through parallelism, each processor must be permitted to carry the model forward as fast as possible, in some local process time. A requirement for synchronization, which would be achieved through message causality among interrelated processes, can restrict the potential for speed gain.

Maintaining message causality can cause delays that negate the benefit of parallelism. For example, if one processor is capable of executing the model faster than another, but requires the results of the slower process, then the system is reduced to the speed of the slowest process. The instant invention overcomes this by adopting an optimistic simulation technique. In an optimistic simulation technique, parallel processes are assumed (optimistically) to be independent, and are permitted to process messages as fast as they arrive. If a message arriving later corresponds with a time earlier than the local process time, then a correction is made. That correction is called a rollback.

Figure 1:
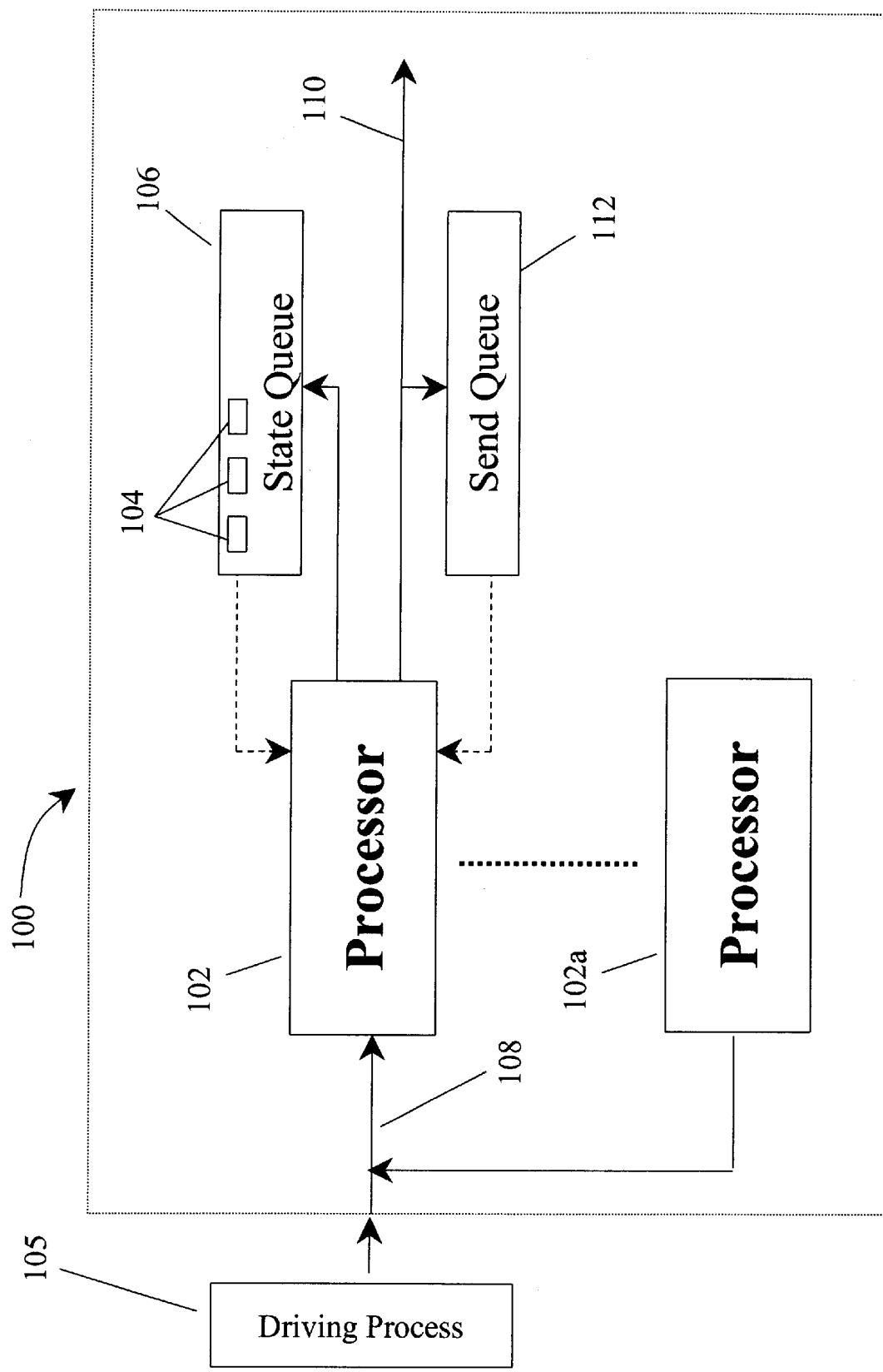
FIG. 1 is a schematic overview of one of a plurality of processors in the distributed control model of the present invention.

Referring now to FIG. 1, the method according to the present invention begins with a distributed control model 100 having control processes distributed among a plurality of processors 102, 102a, etc. Certain load sharing algorithms, or functions for mapping the model to the various processors, are known in the art and are suitable for the purposes of the present invention. Preferably, the model is mapped to the various processors by means of a dynamic load-sharing algorithm which can adjust for changing processing demands.

Each processor 102 is associated with a plurality of active state objects 104. These active state objects 104 contain the necessary code to execute the model beyond the current global real-time, hereinafter referred to as wallclock time. Active state objects 104 also contain information on the state of the model at a given local process time.

The prediction capability of the active state model requires "driving processes" 105 that inject virtual messages into the model. These are messages or events anticipated to exist in the future. The driving processes 105 are most easily identified as mock sensors. These mock sensors feed anticipated future sensor information into the model. These driving processes 105 can reside within the model itself, or virtual messages may be generated by the sensors. Both would predict future values based upon recent history.

The control processes themselves are also driving processes, in as much as messages resulting from a given process corresponding to some future time may be used by another process to advance the model even further into the future. This interdependency will be explained in more detail, infra.

Figure 2:
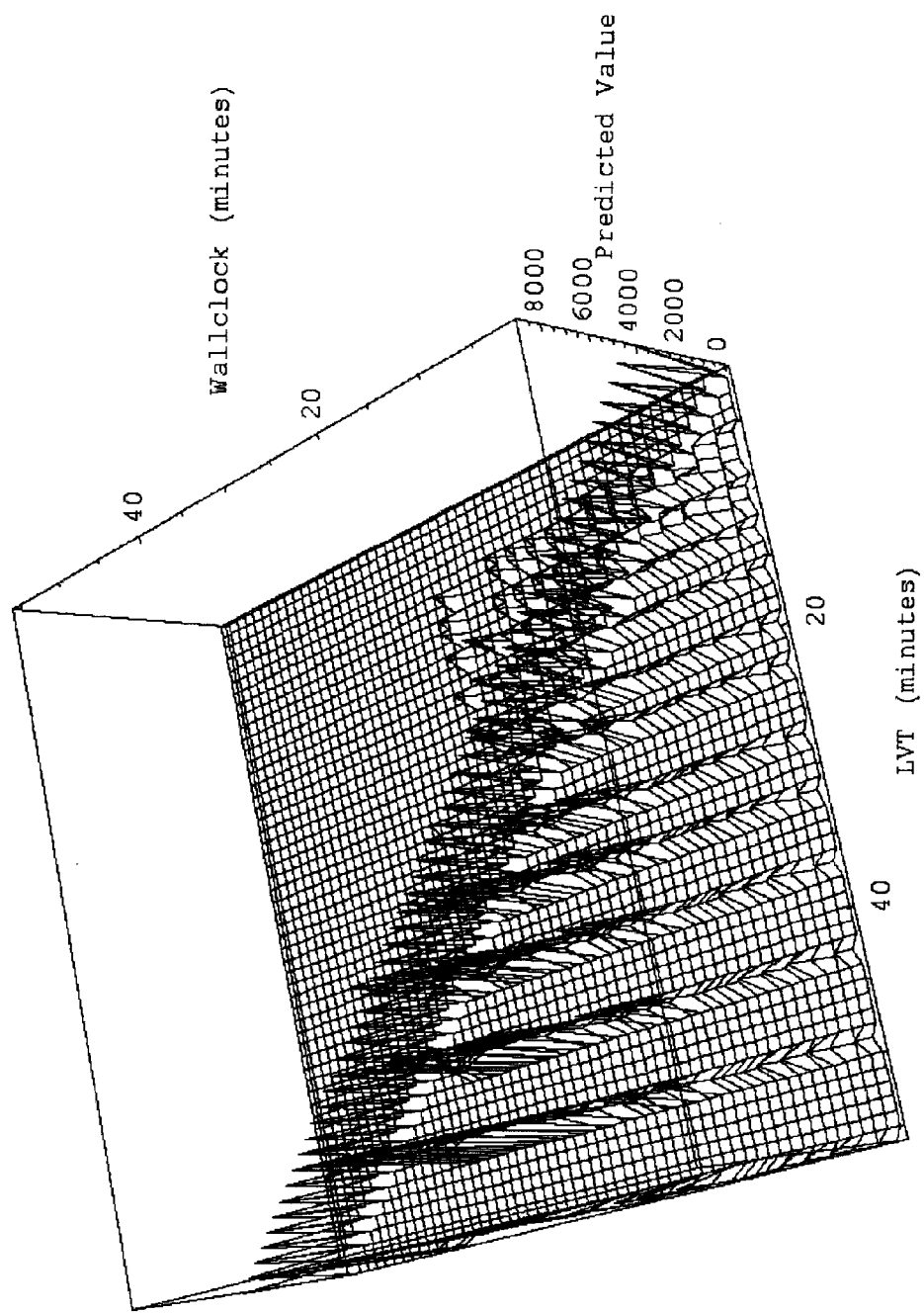
FIG. 2 graphically illustrates the values contained in an example active state cache according to the present invention.

The active state system of the present invention includes a state queue 106 associated with each processor that holds future, past and present active state objects. FIG. 2 is a graph of the values contained in an example active state cache. Note that for any given wallclock time, there are active state objects for local process times (LVT) in the past and the future. Past active state objects are used in the rollback procedure, future active state objects are used in calculations that carry the model further forward.

To carry the model forward, a processor 102 will receive a message 108 from either a driving process 105, or another processor 102a. That message will be labeled with receive time, referring to some wallclock time in the future to which the message corresponds. The message will also be labeled with a send time, corresponding to the local process time when the message was actually sent. Messages 108 will further have a one-bit flag to indicate if the message is a real message, or an anti-message sent for the purposes of nullifying a previous message, associated with the rollback procedure, described infra.

Assuming the message is a real message, the processor 102 executes the model according to the information the message contains. The processor 102 will then record the results as the state of the model at the receive time of the incoming message 108, establishing that receive time as the local process time, and produces a sent message 110 with that information to other processors in the system. The sent messages 110 will have both a receive time and a send time. The difference is to account for the time required ($\Delta t$) to process the message downstream. For example, the sent message 110 at local process time t+1 will be a prediction of the system state at process time t+1+$\Delta t$. The receive time of the sent message would be t+1+$\Delta t$, while the send time is t+1. This allows for more accurate predictions, while still maintaining integrity to allow for rollbacks. The sent messages 110 are also stored in a send queue 112. The processor 102 will then execute the model according to the next incoming message 108.

If a processor 102 receives a message having a receive time that precedes the current local process time, then the processor will execute a rollback. In executing a rollback, the processor will retrieve from the state queue 106 the state object 104 having the latest valid local process time prior to the receive time of the incoming message 108, roll the local process time back to that time, and re-execute the model according to the information contained in the incoming message 108. Then, drawing from the sent messages 110 stored in the send queue 112, the processor will then send out anti-messages, which nullify any sent message 110 sent by the processor 102 corresponding to a time later than the rolled-back local process time. Processor 102 will also issue a new sent message 110 based on the revised state of the model at the current local process time.

Upon receiving an anti-message, the processor 102 will also rollback to the local process time corresponding to the receive time on the anti-message. It will send anti-messages to nullify any message sent by the processor corresponding to a time later than the rolled-back local process time, but will not re-execute the model or send any additional messages until it receives a new true message.

Figure 3:
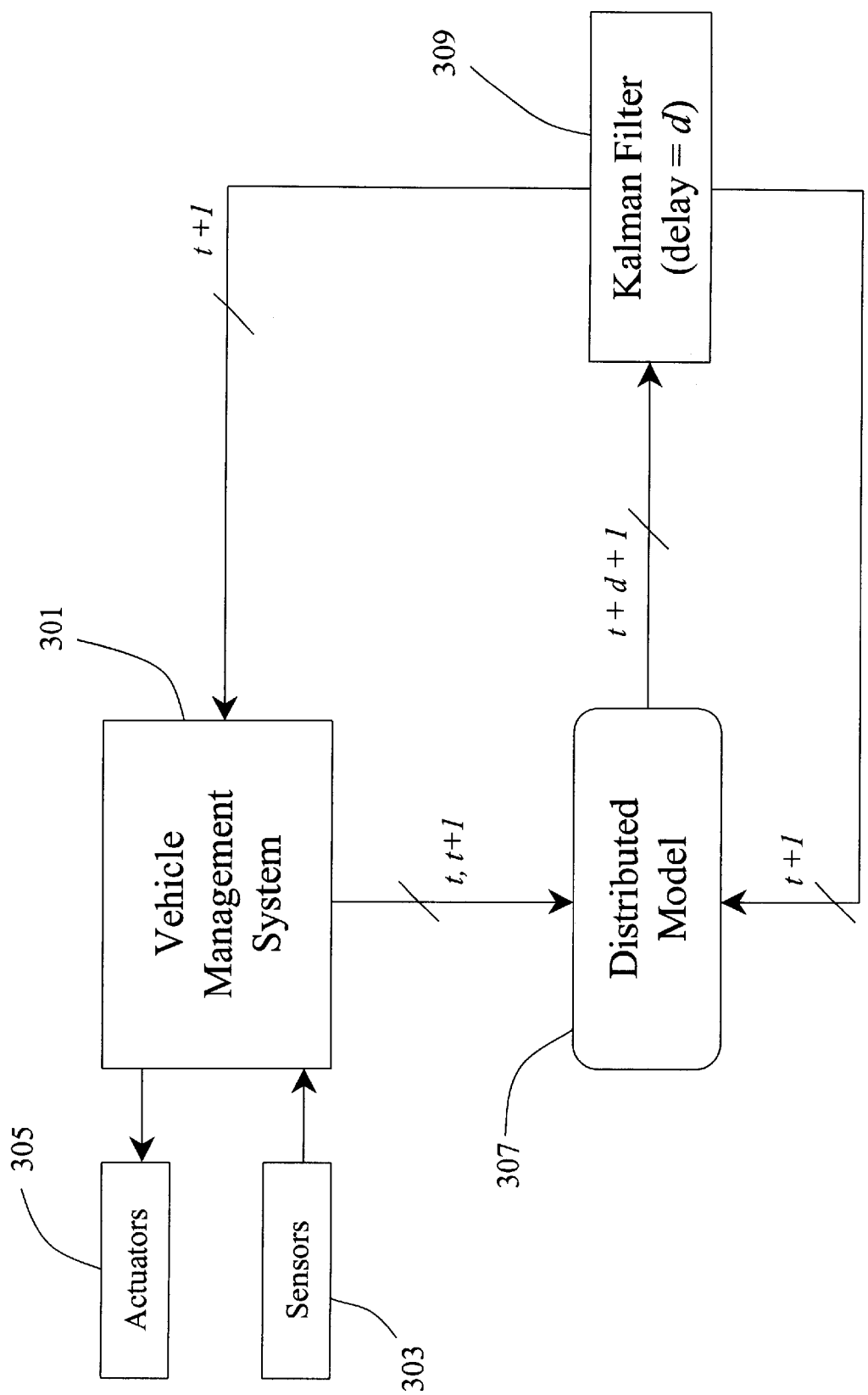
FIG. 3 is a schematic overview of the control system, including the controlled distributed model.

A high level view of a proposed distributed model used to control a vehicle, such as a UAV, is shown in FIG. 3. In this embodiment, the Vehicle Management System 301 represents the interface to the physical sensors 303 and actuators 305 of the aircraft. In one embodiment, sensors 303 contain the driving processes, and provide both real-time messages and predicted messages corresponding to times t and t+1, respectively. The distributed model 307, comprised of the model 100 shown in FIG. 1, represents a simulation of the aircraft running upon multiple processors, either on-board the aircraft or even on multiple aircraft in the case of swarms.

The term swarm should be defined more precisely at this point. A swarm consists of multiple vehicles acting as a single organism. The vehicles move together as a single entity towards accomplishing a common objective. This does not mean that each vehicle behaves identically. Like many organisms, the swarm may have different functionality distributed throughout. In more advanced instances, this could require that command and control will travel from one node to another, one vehicle to another, through multiple vehicles which act as routers.

The predicted values at time t+d+1 can be used by a Kalman filter 309, having a delay, d. Though not strictly required, the Kalaman filter 309 performs some smoothing of the predicted values, which limits any tendency for wild prediction fluctuations, thereby further preventing rollback. The output from the Kalman filter 309 corresponding to time t+1 is fed back into the model and the Vehicle Management System 301 to control the actual system.

Optimistic parallel simulation techniques as known have certain weaknesses that have prevented successful application in a real-time control environment. One of these weaknesses is that, while optimistic parallel simulation can provide tremendous speedup, rollbacks can cause sudden periods of performance degradation. The present invention includes two mechanisms, each complementing the other, to limit the number of rollbacks, thus improving performance.

The first mechanism is a limited look-ahead window. The predictions become less accurate the further they are projected into the future. Limiting the forward progress of the model limits the potential for extreme errors that need to be corrected. The optimal look-ahead window is primarily dependent upon the specific control model used, though in preliminary testing a look-ahead window of about 2 seconds proved workable. Beyond that time frame, the computational overhead of projecting the model forward in time becomes prohibitive to real-time control. Further, the accuracy of future predictions becomes questionable with longer look-ahead windows, with a higher probability that the overhead spent will be mooted by a rollback.

The other mechanism is the tolerance established for projected values. As wallclock time approaches the local process time, sensors 303 will send messages containing observed system values to the distributed model 307. Messages containing observed values will have a receive time equal to wallclock time, compared with those having predicted values will have receive times later than wallclock time. The processor 102 distinguishes between received messages 108 having predicted values and those having observed values. The distributed model 307 will compare the observed values to the values predicted earlier.

Using a strict fidelity optimistic model, any deviation of a parameter's actual value at wallclock time from the value predicted for that time would initiate a rollback. Since the model's predictions cannot be perfectly accurate, numerous rollbacks would negate the speed advantage, reducing the system to the equivalent of simple reactive step-responses and transfer functions, or possibly worse.

The problem or rollbacks at a wallcock time did not exist before the application of the optimistic distributed techniques to real-time control problems. Previously, optimistic parallel technique had been applied only to simulations. In those applications, there is no real-time feedback that might cause additional rollbacks. To overcome this problem in a real-time environment, a tolerance for predicted values is established. An observed value within a certain tolerance of the predicted value will not initiate a rollback. This tolerance intelligently sacrifices fidelity in the model in exchange for speed. The overall results, notwithstanding the fidelity losses, are vastly improved over such simple reactive step-responses and transfer functions.

In light of this tradeoff, a measure that is a ratio of fidelity to speedup is likely to be required. One method is to examine logical process state before and after the non-causal message is executed. If there is no state change, i.e., the message order is interchangeable, then clearly there has been no loss in fidelity.

Figure 4:
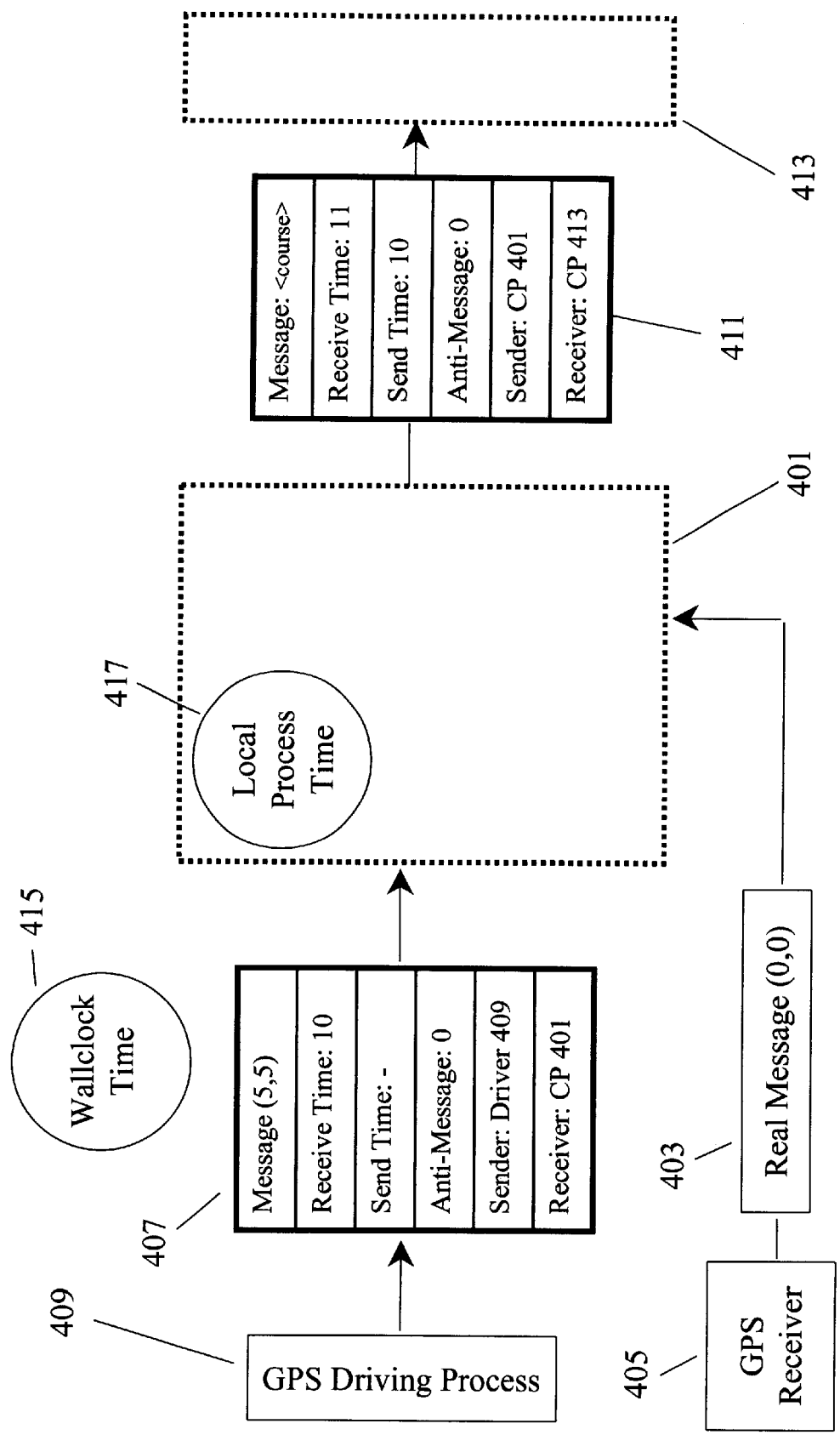
FIG. 4 is a schematic diagram illustrating an embodiment of the present invention for use in tracking the position of a UAV.

An example of implementing this tolerance is shown in FIG. 4. In that example, the parameter being controlled is the position of a UAV, as measured by a GPS system. Beginning in FIG. 4A, the first control process (CP) 401 receives real messages 403 from a GPS receiver 405, and virtual messages 407 from a GPS driving process 409. In this example, the function of first control process 401 is to compute the optimal route based on required waypoints. Sent messages 411 from the first control process 401 are sent to a second control process 413, which determines the flight control commands required to follow the prescribed course to reach the waypoints. Clock 415 indicates the wallclock time, and processor clock 417 indicates the local process time.

Table 1 shows the data contained in successive virtual messages 407 and real messages 403. Note that the receive time of virtual messages 407 is advancing faster than wallclock time. This is expected and necessary for predictive computation.

TABLE 1

| Wallclock Time | Predicted Data (receive time, x, y) | Observed Data (wallclock time, x, y) |
|---|---|---|
| 0 | (10, 5, 5) | (0, 0, 0) |
| 2 | (20, 10, 10) | (2, 2, 2) |
| 10 | (30, 15, 15) | (10, 10, 10) |
| 20 | (60, 40, 40) | (20, 20, 20) |

At wallclock time t=10, control process 401 will compare the real data to the predicted data. In this example, the tolerance is a Euclidean distance of 10. The observed data has a distance of 7.07 from the predicted data, within tolerance, and no rollback is performed. However, at time t=20, the Euclidean distance grows to 14.14 outside the tolerance and necessitating a rollback. Control process 401 sends anti-messages to nullify any sent messages 411 having a send time of 20 or later, then resumes processing incoming messages.

The invention has been described herein with reference to particular exemplary embodiments. Certain alterations and modifications may be apparent to those skilled in the art, without departing from the scope of the invention. The exemplary embodiments are not meant to be limiting on the scope of the invention, which is defined by the appended claims.

What is claimed is:

1. A method of real-time predictive control, said method comprising the steps of:
    (a) generating a message that predicts a system value, said message having a receive time corresponding to a future time;
    (b) executing a control process using the system value contained within said message, resulting in a process state having a local process time Corresponding to the receive time of said message;

(c) storing the process state in a state queue;

(d) rolling back the process state to the latest valid local process time prior to the receive time of said message, only if said receive time precedes the current process state time, said rolling back comprising:

(i) retrieving the system state value at said latest valid local process time from said state queue; and (ii) performing steps (b) and (c), above, using the system value contained within said message.

2. The method of real-time predictive control according to claim 1, further comprising:

(e) sending messages containing the results of the control process, said messages having a receive time corresponding to the local process state time; and (f) storing said sent messages in a send queue.

3. The method of real-time predictive control according to claim 2, wherein said rolling back step further comprises:

(iii) sending anti-messages which nullify any messages having a send time later than the receive time of the message which initiated the rollback.

4. The method of real-time predictive control according to claim 3, further comprising executing steps (d)(i) and (d)(iii) upon receiving an anti message having a receive time that precedes the local process time.

5. The method of real-time predictive control according to claim 2, further comprising:

(g) filtering said sent messages through a Kalman filter.

6. The method of real-time predictive control according to claim 1, further comprising:

(h) rolling back according to step (d), only if, upon receiving a message containing an observed system value, said observed system value differs from its predicted value by more than a predetermined tolerance.

7. A real-time predictive control system comprising a machine readable storage medium containing a program of instructions for causing a computer to perform the following steps:

(a) generating a message that predicts a system value, said message having a receive time corresponding to a future time;

(b) executing a control process using the system value contained within said message, resulting in a process state having a local process time corresponding to the receive time of said message;

(c) storing the process state in a state queue;

(d) rolling back the process state to the latest valid local process time prior to the receive time of said message, only if said receive time precedes the current process state time, said rolling back comprising:

(i) retrieving the system state values at said latest valid local process time from said state queue; and (ii) performing steps (b) and (c), above, using the system value contained within said message.

8. The real-time predictive control system according to claim 7, further comprising a Kalman filter.

9. The real-time predictive control system according to claim 7 wherein the system being controlled is an unmanned air vehicle.

10. The real-time predictive control system according to claim 7 wherein the system being controlled is a plurality of unmanned air vehicles.

11. The real-time predictive control system according to claim 10 wherein said plurality of unmanned air vehicles comprises a swarm.

12. The real-time predictive control system according to claim 7 wherein said computer includes multiple processors operating in parallel.

13. The real-time predictive control system according to claim 12 wherein said multiple processors are distributed among a plurality of unmanned air vehicles which comprise a swarm.

14. A method of optimistic parallel real-time predictive control, comprising the steps of:

(a) providing a plurality of processors capable of working in parallel;

(b) distributing control processes among said plurality of processors;

(c) providing driving processes for generating messages that predict system values, said messages having a receive time corresponding to a future time;

(d) executing a control process with one of said plurality of processors, using the system values contained within said messages, in the order said messages arrive, resulting in a process state having a local process time corresponding to the receive time of said message;

(e) sending messages containing the results of said control process to other processors for further computation, said sent messages having a receive time corresponding to the local process state time;

(f) rolling back the local process time to the latest valid time before the receive time on an incoming message if said receive time precedes the current process time; and (g) rolling back the local process time to the current wallclock time if an observed system value differs from its predicted value at the wallclock time by more than a predetermined tolerance.

15. The method of optimistic parallel real-time predictive control according to claim 14 further comprising controlling at least one unmanned air vehicle.

16. The method of optimistic parallel real-time predictive control according to claim 14 further comprising distributing said multiple processors among a plurality of unmanned air vehicles which comprise a swarm.

* * * * *